(12) United States Patent
Takanashi

(10) Patent No.: US 9,581,424 B2
(45) Date of Patent: Feb. 28, 2017

(54) ROUNDNESS MEASURING APPARATUS

(71) Applicant: Tokyo Seimitsu Co., Ltd., Hachioji, Tokyo (JP)

(72) Inventor: Ryo Takanashi, Hachioji (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 188 days.

(21) Appl. No.: 14/565,058

(22) Filed: Dec. 9, 2014

(65) Prior Publication Data
US 2016/0161239 A1    Jun. 9, 2016

(51) Int. Cl.
*G01B 5/20* (2006.01)
*G01B 5/00* (2006.01)

(52) U.S. Cl.
CPC .............. *G01B 5/201* (2013.01); *G01B 5/0014* (2013.01); *G01B 5/20* (2013.01)

(58) Field of Classification Search
CPC .......... G01B 5/201; G01B 5/20; G01B 5/0014
USPC .................. 33/502–503, 550–551, 553–554, 33/556–557, 560
See application file for complete search history.

(56) References Cited

U.S. PATENT DOCUMENTS

| | | | | |
|---|---|---|---|---|
| 4,593,476 A * | 6/1986 | Clark | ...................... | G01B 5/207 33/529 |
| 4,807,152 A | 2/1989 | Lane et al. | | |
| 4,953,306 A * | 9/1990 | Weckenmann | ........ | G01B 21/04 33/1 M |
| 4,961,267 A * | 10/1990 | Herzog | ................ | G01B 11/005 33/1 M |
| 5,694,339 A | 12/1997 | Ishitoya et al. | | |
| 5,829,151 A * | 11/1998 | Collier | ..................... | B23Q 7/14 33/1 M |
| 5,901,455 A * | 5/1999 | Leitenberger | .......... | G01B 5/004 33/503 |
| 6,108,924 A * | 8/2000 | Jang | ........................ | G01B 5/207 33/552 |
| 6,298,572 B1 * | 10/2001 | McAuley | ............. | G01B 5/0002 269/37 |
| 6,701,633 B2 * | 3/2004 | Ohtsuka | ............... | G01B 11/005 33/503 |
| 7,096,077 B2 * | 8/2006 | Price | ................... | B23Q 3/15546 439/488 |
| 7,950,164 B2 * | 5/2011 | Nakayama | ............. | G01B 3/008 33/556 |

(Continued)

FOREIGN PATENT DOCUMENTS

| JP | 01-259211 | 10/1989 |
|---|---|---|
| JP | 02-99301 | 8/1990 |

(Continued)

*Primary Examiner* — R. A. Smith
*Assistant Examiner* — Tania Courson
(74) *Attorney, Agent, or Firm* — Lewis Roca Rothgerber Christie LLP

(57) ABSTRACT

A roundness measuring apparatus, which has a small space required for installation and of which measurement error due to a temperature change is small, is disclosed. The roundness measuring apparatus includes: a base; a turn-table which is fixed to the base and rotates a work placed on the turn-table; a two-dimensional moving mechanism provided at the base so as to move a holder holding part in parallel to a measurement plane including a rotation axis of the turn-table and a measuring point of the work; a detector holder attached to the holder holding part; and a detector attached to the detector holder so that a probe can be displaced on the measurement plane.

1 Claim, 10 Drawing Sheets

(56) References Cited

U.S. PATENT DOCUMENTS

| | | | |
|---|---|---|---|
| 8,131,385 B2* | 3/2012 | Yuzawa | G05B 19/27 318/561 |
| 8,336,223 B2* | 12/2012 | Nakayama | G01B 21/047 33/503 |
| 2006/0101660 A1 | 5/2006 | Takanashi | |

FOREIGN PATENT DOCUMENTS

| | | |
|---|---|---|
| JP | U3141561 | 4/2008 |
| JP | 2013-108757 | 6/2013 |
| JP | 2014-077765 | 5/2014 |

* cited by examiner

ROUNDNESS MEASURING APPARATUS

TECHNICAL FIELD

The present invention relates to a roundness measuring apparatus.

BACKGROUND TECHNOLOGY

The roundness measuring apparatus which measures a roundness of a cylinder outer surface or a cylinder inner surface of an object (work) to be measured is used widely.

FIG. 1 is an outline view of a conventional roundness measuring apparatus.

The roundness measuring apparatus includes: a table-like base 1; a rotatable stage 2 provided at the base 1; a rotation drive part 3 having a motor, etc., for rotating the stage 2; a column 4 provided at the base 1; a carriage 5 which is movable along the column 4; an arm 6 which is movable with respect to the carriage 5; a detector holder 9 attached to a tip of the arm 6; and a detector 10 attached to the detector holder 9. The detector 10 includes a probe 11 and a displacement detection part such as a differential transformer, and outputs an electrical signal which shows displacement of the probe 11.

A work 12 is placed on the stage 2 so that a center axis of a cylinder surface of the work 12 almost coincides with a rotation axis of the stage 2, and the work 12 is rotated. The column 4 is a pillar extending in parallel to the rotation axis of the stage 2. The carriage 5 is movable along the column 4. Generally, the carriage 5 is manually moved along a guide surface of the column 4, but it may be moved automatically using a motor, etc. The arm 6 is manually moved along a guide surface of the carriage 5, but is may be moved automatically using a motor, etc. The detector holder 9 is a component having an L shape, one end of the detector holder 9 is attached at the tip of the arm 6, and the detector 10 is attached to the other end of the detector holder 9. In order to detect a change of height position of a flange portion of the work 12, the detector holder 9 may be able to be attached at the tip of the arm 6 with three different directions by a unit of 90 degrees. Further, in order to change a direction of the cylinder surface to be measured by 180 degrees, the detector 10 may be able to be attached to the detector holder 9 at different directions.

When the measurement is carried out, the work 12 is placed on the stage 2 so that the center axis of the cylinder surface of the work 12 almost coincides with the rotation axis of the stage 2. In order to contact the probe 11 at a position of the work 12 to be measured, a vertical position of the probe is adjusted by moving the carriage 5 and a position of radial direction is adjusted by moving the arm 6. A roundness of the work 12 is measured in this state. When a high-precision measurement is carried out, eccentricity of the center axis of the cylinder part of the work 12 from the rotation axis of the stage 2 is measured by rotating the work 12, and the rotation axis of the stage 2 is adjusted to correctly coincide with the rotation axis of the stage 2 by using an XY moving mechanism provided at the stage 2. At this time, the probe 11 is desirable to be near a center of a displacement range.

FIG. 2 is a plan view of the roundness measuring apparatus of FIG. 1.

As illustrated in FIG. 2, the column 4 is provided at the right-hand side of the stage 2. The arm 6, the detector holder 9 and the detector 10 are arranged on a straight line, and the rotation center axis of the stage 2 is placed on extension of the straight line. The probe 11 is provided at a tip of the detector 10, and the probe 11 is displaced on a plane formed by this straight line and the rotation axis of the stage 2. Therefore, when the work 12 having a cylinder surface of a different diameter is measured, the arm 6 is moved so that the probe 11 contacts the cylinder surface to be measured. In this description, a plane formed by a measurement point on a cylinder surface to be measured at which the probe 11 contacts and the rotation center axis of the stage 2 is called a measurement plane, and a direction connecting the rotation center axis of the stage 2 and the measurement point is called a radial direction. In other words, even when cylinder surfaces having different diameters are measured, the arm 6, the detector holder 9 and the detector 10 are moved in the radial direction along the measurement plane, and the probe 11 contacts with a cylinder surface to be measured on a line at which the measurement plane and the cylinder surface cross, and displaces on the measurement plane.

A first reason for providing the column 4 on the right-hand side of the stage 2 (left-hand side may be also acceptable) is for moving the arm 6 on a measurement plane. A second Reason is for enabling to detect a difference of radiuses (diameters) of cylinder surfaces of different cylinder surfaces is detectable by detecting movement magnitude of the arm 6.

For the above reasons, the column 4 has been provided at one side (right-hand side or left-hand side) of the stage 2 in conventional roundness measuring apparatuses. Therefore, the base 1 where the column 4 is fixed has a rectangle shape being long in a radial direction in the plan view. Since the arm 6 is moved in the radial direction according to radiuses of cylinder surfaces to be measured, a setting space needs to be determined in consideration of the case where the arm 6 moves to the utmost rightward. For the above reasons, the conventional roundness measuring apparatuses need the setting space of a rectangle shape being long in the radial direction, and there has been a problem that a space required for installation is large.

Since a conventional roundness measuring apparatus has a long arm 6, there has been a problem that a displacement of the detector 10 attached at the tip of the arm 6 and the detector holder 9 is large even if there is a small temperature change in a short time during measurement. Further, since the displacement directly influences a measurement value, there has been a problem that an error due to the temperature change is large.

SUMMARY OF THE INVENTION

The object of the present invention is to realize a roundness measuring apparatus which has a small space required for installation and of which measurement error due to a temperature change is small.

In order to solve the above problem, according to a roundness measuring apparatus of the present invention, a two-dimensional moving mechanism which moves a holder holding part in parallel to a measurement plane is provided at the back of a base, a detector holder is attached to the holder holding part, and a detector is attached to the detector holder. According to this constitution, a probe is displaceable on a measurement plane.

That is, a roundness measuring apparatus according to the present invention includes: a base; a turn-table which is fixed to the base and rotates a work placed on the turn-table; a two-dimensional moving mechanism provided at the base so as to move a holder holding part in parallel to a measurement plane including a rotation axis of the turn-table and a measuring point of the work; a detector holder attached to the holder holding part; and a detector attached to the detector holder so that a probe can be displaced on the measurement plane.

According to the present invention, since the two-dimensional moving mechanism is provided at the back of the base, a setting space is made to have a form near a square, and a setting space (space required for installation) can be made small.

Further, in the conventional roundness measuring apparatus illustrated in FIG. 1, a detector is attached to the arm and detector holder which extend along a measurement plane from a column. Therefore, if the arm expands or contracts due to a temperature change, the amount of expansion and contraction directly influences a measurement value. When an arm is long, the amount of expansion and contraction of the arm due to a temperature change in a short time becomes so large that it cannot be disregarded, and therefore results in a measurement error.

On the other hand, according to the present invention, a long arm is not used and the detector holder extends from the two-dimensional moving mechanism in a direction vertical to the measurement plane. Therefore, even if the detector holder expands or contracts due to a temperature change, the amount of the expansion or contraction does not directly influence a measurement value. Accordingly, the influence of the temperature change to the measurement error can be reduced.

The two-dimensional moving mechanism desirably includes: a first column which extends in parallel to the rotation axis of the turn-table and moves in parallel to the measurement plane; and a first holding part moving mechanism which supports the holder holding part to be movable along the first column, i.e., in a vertical direction. In accordance with a radius of a cylinder surface to be measured, a measuring state in which a probe contacts with the cylinder surface to be measured is obtained by moving the first column in parallel to the measurement plane. Further, a position of a contact point of the probe with the cylinder surface in the vertical direction, i.e., a height is adjusted by moving the holder holding part along the first column by using the first holding part moving mechanism.

A moving mechanism which moves the first column in parallel to the measurement plane is desirable to include: a guide mechanism which holds the column in parallel to the rotation axis of the turn-table; and a feed mechanism which moves the column.

Further, two independently movable columns may be provided to simultaneously measure roundness at two points of the work. This constitution makes enable to measure a diameter and to measure a long and slender work with a minimum distortion.

The moving mechanism of the two columns desirably shares a guide structure which holds the two columns in parallel to a rotation axis of the turn-table, and includes an independent feed mechanism.

Further, the two-dimensional moving mechanism may include: a column which extends in parallel to the rotation axis of the turn-table; a moving part which is supported to be movable along the column; and a holding part moving mechanism which is attached to the moving part and moves the holder holding part in parallel to the measurement plane. According to this constitution, the holding part moving mechanism can be made small since the column is fixed.

According to the present invention, a roundness measuring apparatus with a small space required for installation is realized.

DESCRIPTION OF EMBODIMENTS

Figure 3:
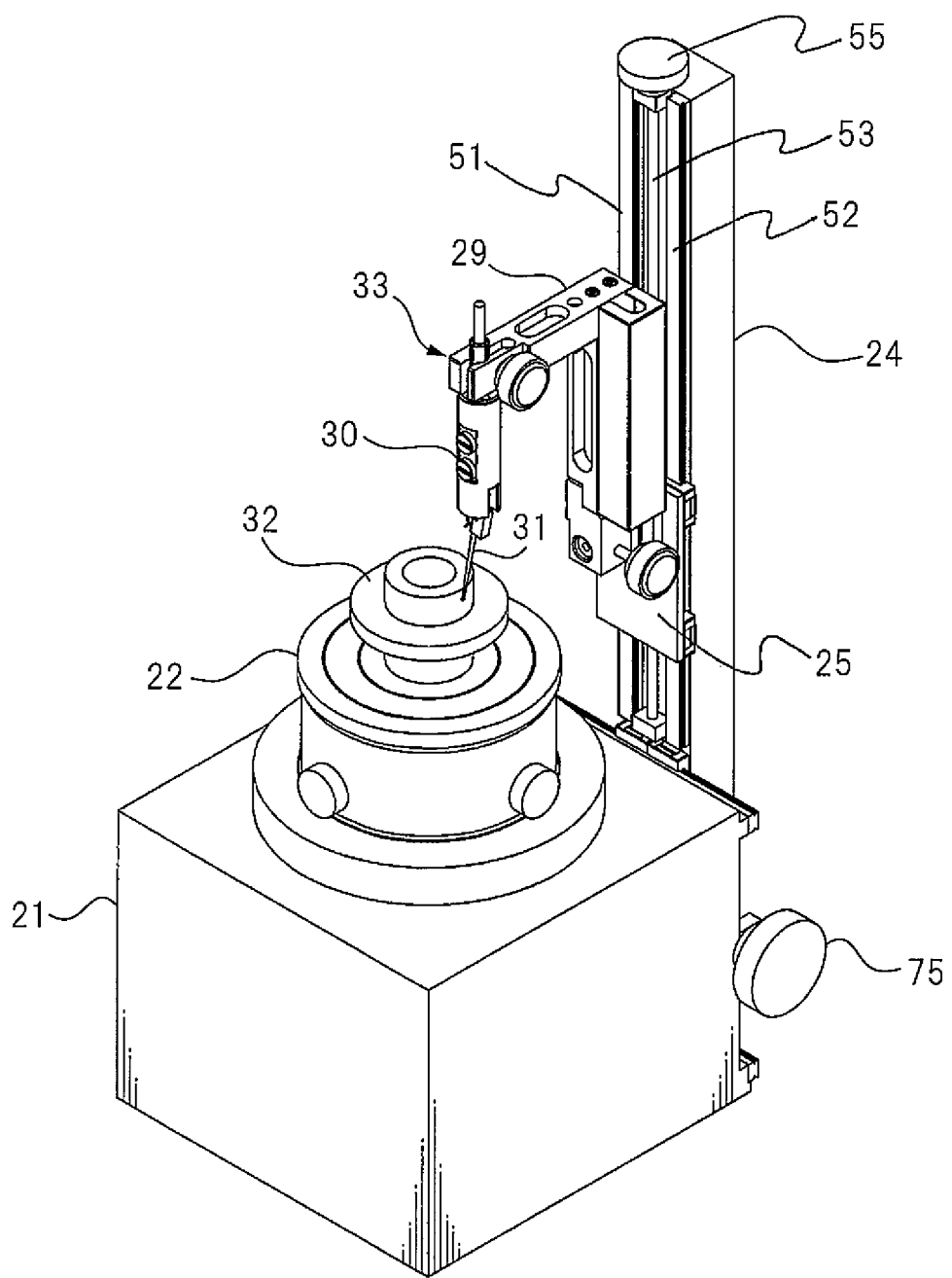
FIG. 3 is an outline view seen from a front side of a roundness measuring apparatus of a first embodiment of the present invention.
Figure 4:
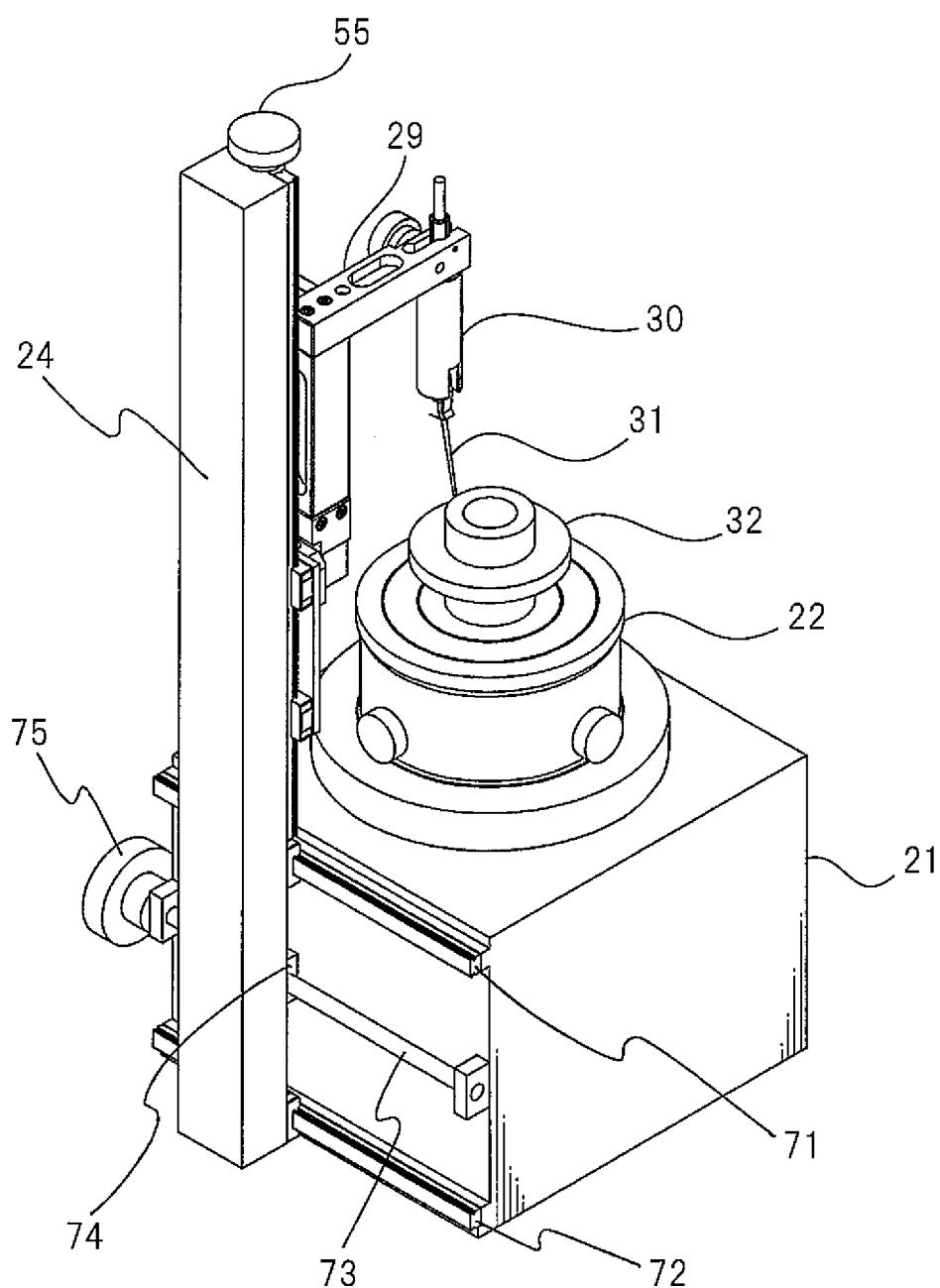
FIG. 4 is an outline views seen from a back side of the roundness measuring apparatus of the first embodiment of the present invention.

FIG. 3 and FIG. 4 are outline views seen from a front side and a back side of a roundness measuring apparatus of a first embodiment of the present invention.

The roundness measuring apparatus of the first embodiment includes: a table-like base 21; a rotatable stage 22 provided at the base 21; a rotation drive part (not shown) having a motor for rotating the stage 2, etc.; a column 24 provided at the back of the base 21; a carriage 25 which is movable along the column 24; a detector holder 29 attached to the carriage 25; and a detector 30 attached to the detector holder 29. The detector 30 has a probe 31 and displacement detection parts, such as a differential transformer, and outputs an electrical signal which shows displacement of the probe 31. The carriage 25 is also called a holder holding part since the detector holder 29 is attached to the carriage 25.

Vertical direction guides 51 and 52 and a vertical direction feed screw 53 are provided on the column 24. The carriage 25 is engaged with the vertical direction feed screw 53 by a vertical direction feed nut. By rotating a vertical direction feed knob 55, the vertical direction feed screw 53 rotates and the carriage 25 moves in the vertical direction. It is also possible to provide a motor, etc., which rotates the vertical direction feed screw 53, in place of the vertical direction feed knob 55, and to move the carriage 25 in the vertical direction. Since the carriage 25 is guided by the vertical direction guides 51 and 52 of high precision, an attitude of the carriage 25 does not change even if it moves. Therefore, even if the detector holder 29 and the detector 30 which are attached to the carriage 25 move in the vertical direction, attitudes thereof do not change but only the position (height) in the vertical direction changes.

Further, radial direction guides 71 and 72 and a radial direction feed screw 73 are provided at the back of the base 21. The column 24 is engaged with the radial direction feed screw 73 by a radial direction feed nut 74. By rotating a radial direction feed knob 75, the radial direction feed screw 73 rotates and the column 24 moves in parallel to the radial direction. The column 24 is movable to a right-hand side and a left-hand side of the stage 22. It is also possible to provide a motor, etc., which rotates the radial direction feed screw 73, in place of the radial direction feed knob 75, and to move the column 24 in parallel to the radial direction. Since the column 24 is guided with the radial direction guides 71 and 72 of high precision, an attitude of the column 24 does not change even if it moves. Therefore, even if the detector holder 29 and the detector 30 which are attached to the column 24 (carriage 25) move in parallel to the radial direction, attitudes thereof do not change but only positions of the radial direction change. In other words, even if the column 24 is moved in parallel to the radial direction in order to measure roundness of cylinder surfaces of different radiuses, the probe 31 of the detector 30 contacts the work 32 on the measurement plane.

Figure 1:
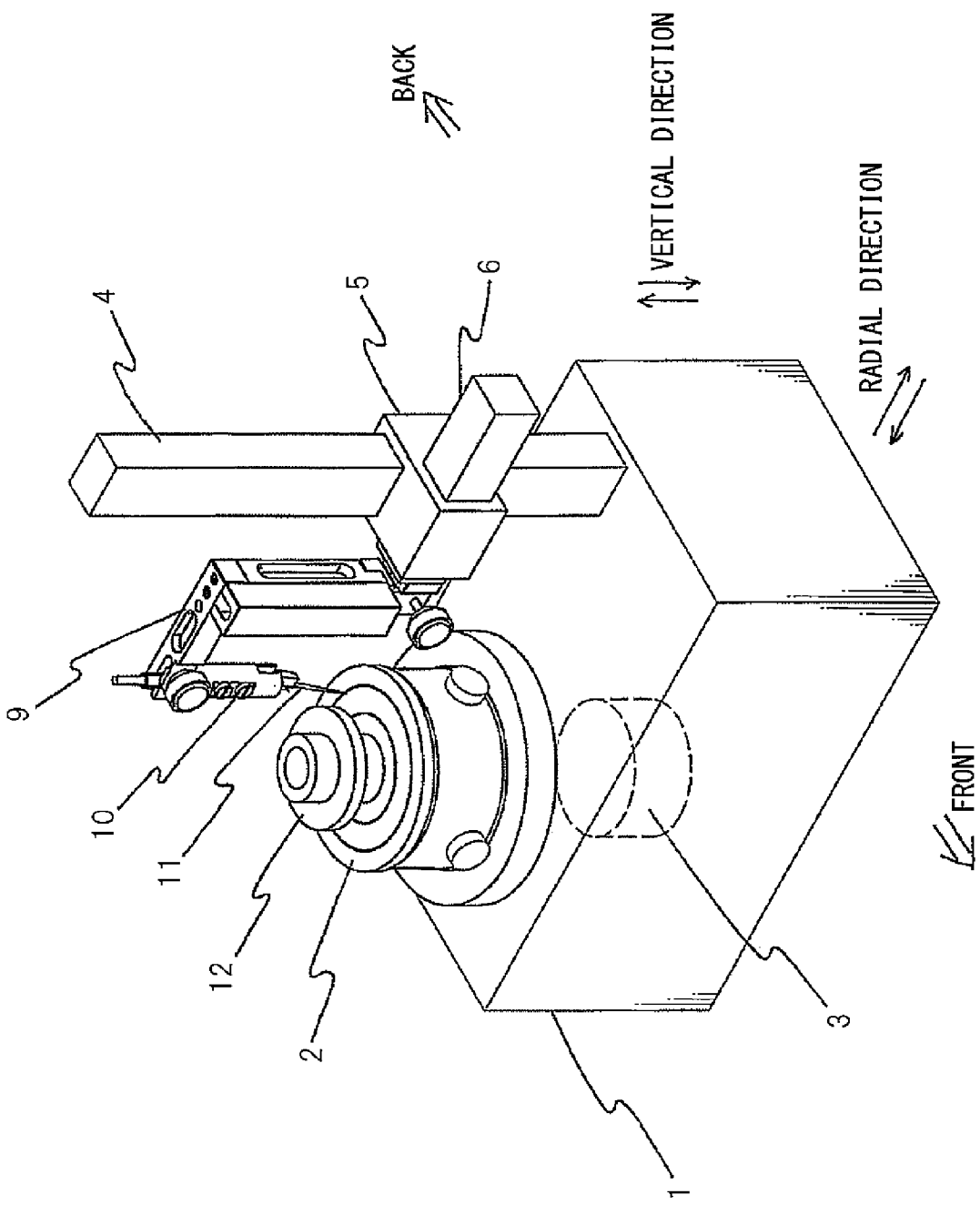
FIG. 1 is an outline view of a conventional roundness measuring apparatus.

The detector holder 29 and the detector 30 are the same as those of the conventional example illustrated in FIG. 1. As described above, in order to detect a change of height position of the flange portion of the work 32, the detector holder 29 is desirable to be attached to the carriage 25 at three different directions by a unit of 90 degrees. Further, in order to change a direction of the cylinder surface to be measured by 180 degrees, the detector 30 is desirable that a direction at which the detector 30 is attached to the detector holder 29 can be changed.

In measuring, the work 32 is placed on the stage 22 so that the center axis of the cylinder surface of the work 32 is almost coincided with the rotation axis of the stage 22. In order to contact the probe 31 at a position of the work 32 to be measured, a vertical position of the probe is adjusted by moving the carriage 25 and a position of radial direction is adjusted by moving the column 24. A roundness of the work 32 is measured in this state. When a high-precision measurement is carried out, eccentricity of the center axis of the cylinder part of the work 32 from the rotation axis of the stage 22 is measured by rotating the work 32, and the rotation axis of the stage 22 is adjusted to correctly coincide with the rotation axis of the stage 22 by an XY moving mechanism provided at the stage 22. After this adjustment, the measuring is carried out. At this time, the probe 31 is desirably near a center of a displacement range.

Figure 5:
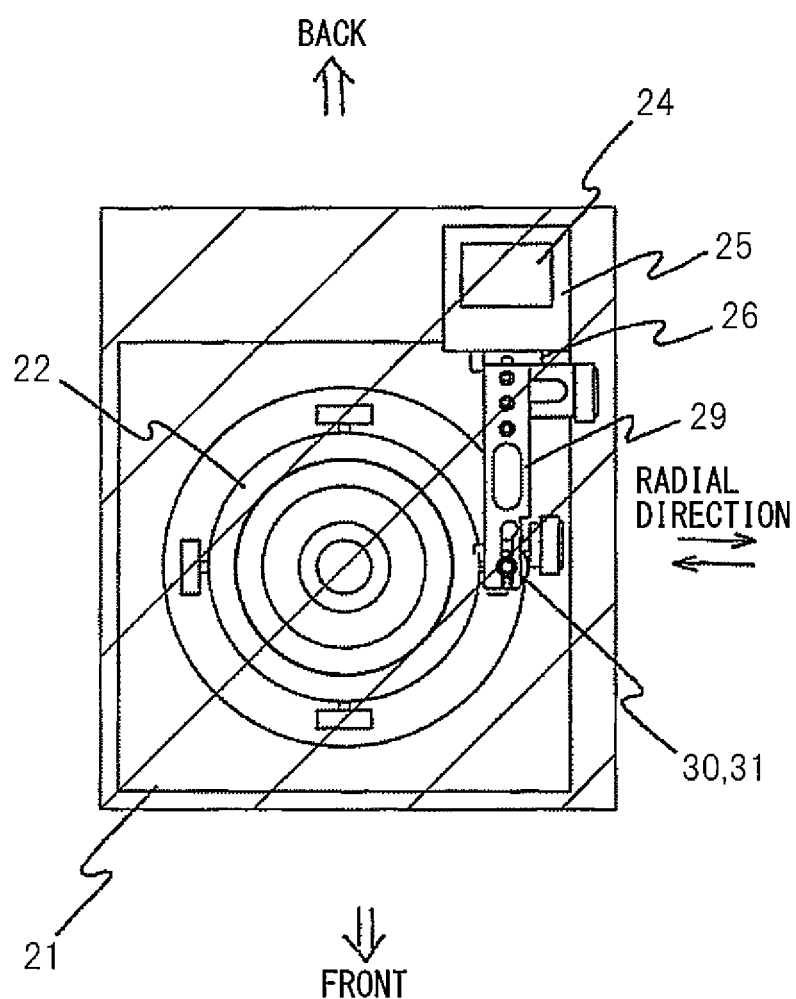
FIG. 5 is a plan view of the roundness measuring apparatus of the first embodiment.

FIG. 5 is a plan view of the roundness measuring apparatus of the first embodiment.

As illustrated in FIG. 5, the column 24 is provided at the back of the stage 22 to be movable in parallel to the measurement plane. The detector holder 29 extends from the carriage 25 in parallel to the measurement plane, and the detector 30 is attached to the detector holder 29 so that the probe 31 can be displaced on the measurement plane. When works 32 having cylinder surfaces of different diameters are measured, the detector holder 29 and the detector 30 are moved in the radial direction along the measurement plane since the column 24 is moved in parallel to the measurement plane. Therefore, the probe 31 contacts the cylinder surface on a line at which the measurement plane and the cylinder surface cross, and displaces on the measurement plane.

Figure 2:
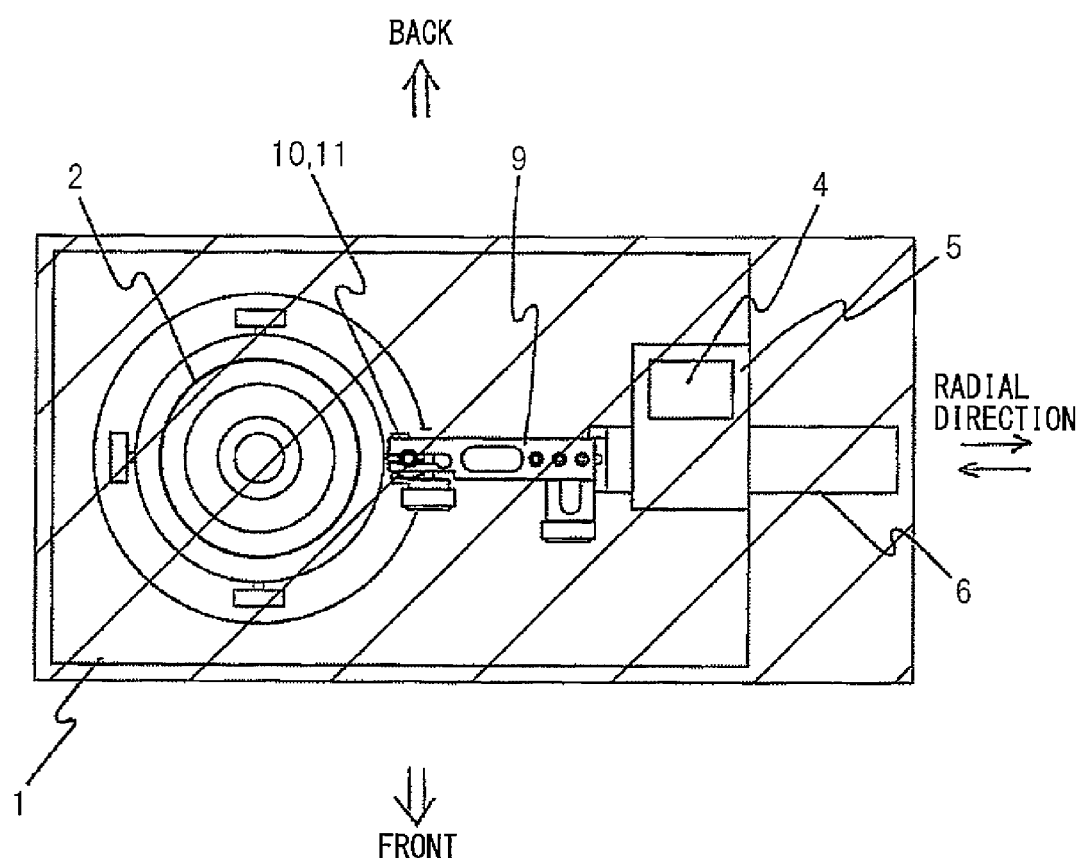
FIG. 2 is a plan view of the roundness measuring apparatus of FIG. 1.

By comparing FIG. 2 with FIG. 5, it is clear that the length of the transverse direction (radial direction) of the base in the roundness measuring apparatus of the first embodiment is shortened compared with that in the conventional roundness measuring apparatus. Further, the setting space of the roundness measuring apparatus of the first embodiment is reduced since an arm does not project beyond a side edge thereof.

As described above, a difference of the radiuses (diameters) of cylinder surfaces can be detected by detecting a moving quantity of the arm 6 in the conventional roundness measuring apparatus. It can be similarly detected by detecting a moving quantity of the column 24 in the roundness measuring apparatus of the first embodiment.

When measuring roundness of an inner cylinder surface of the work 32 by the roundness measuring apparatus of the first embodiment, the probe 31 is contacted to the inner cylinder surface at a point which is at the opposite side of the measuring point illustrated in FIG. 3 with respect to the rotation axis of the stage 22.

Figure 6:
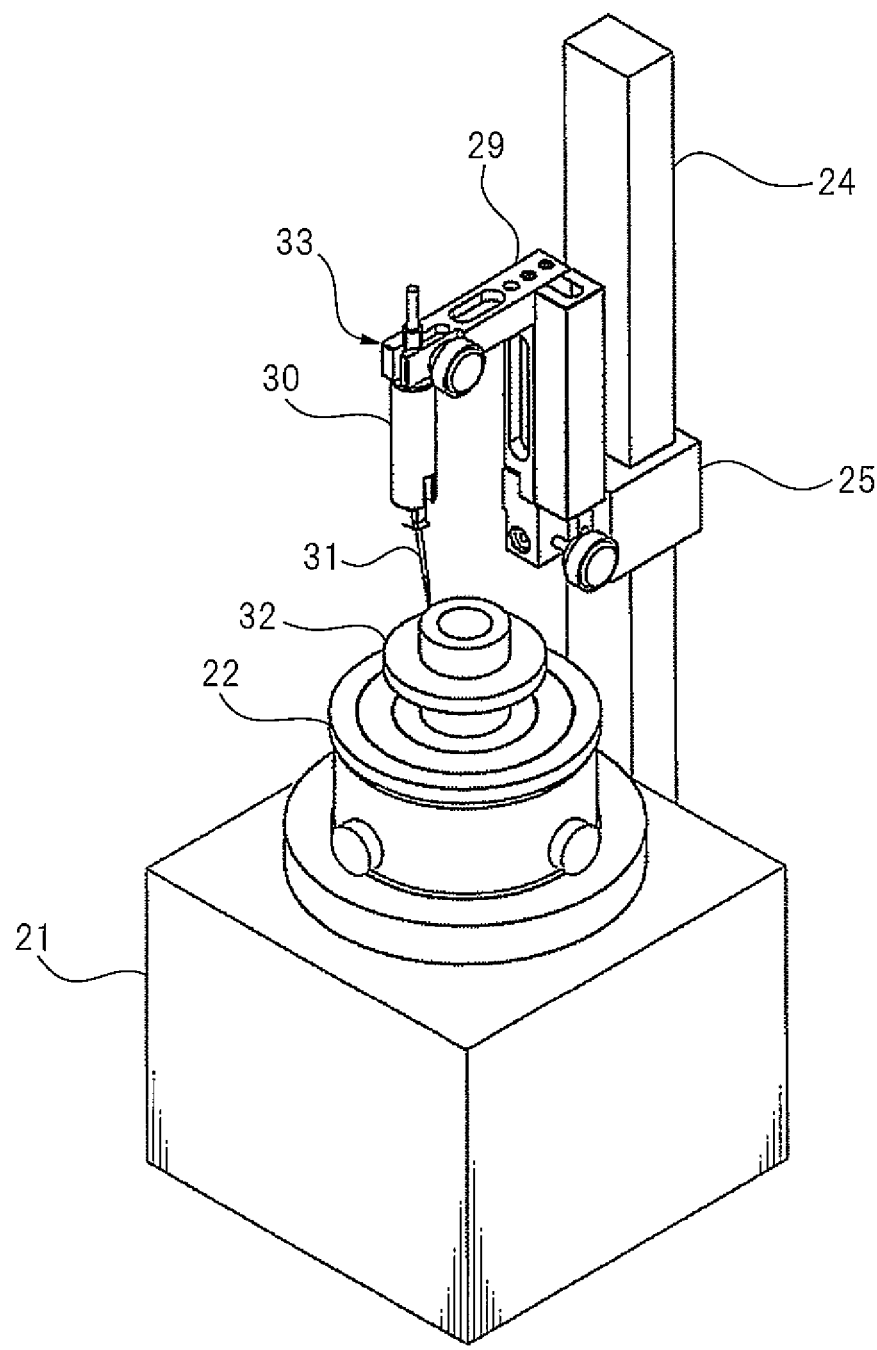
FIG. 6 is a diagram illustrating a measuring state of roundness by the roundness measuring apparatus of the first embodiment in which the probe is contacted at a left-hand side of the outer cylinder surface with respect to the rotation axis of the stage.

FIG. 6 is a diagram illustrating a measuring state of roundness by the roundness measuring apparatus of the first embodiment in which the probe 31 is contacted at a left-hand side of the outer cylinder surface with respect to the rotation axis of the stage 22. Comparing to the state illustrated in FIG. 3, the detector 30 is rotated 180 degrees and attached to a mounting part 33 of the detector holder 29 in this state.

Figure 7A:
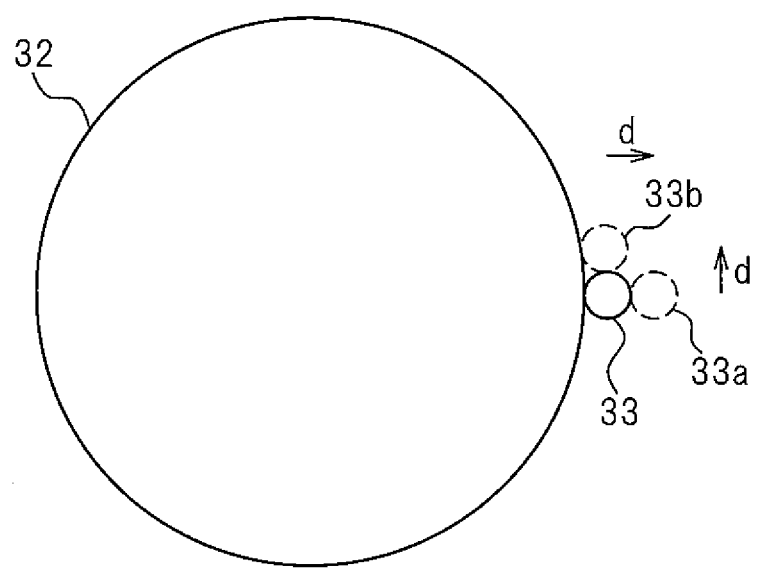
FIG. 7A and FIG. 7B are diagrams explaining a difference of influences of displacement of the probe due to a temperature change between the first embodiment and the conventional example illustrated in FIG. 1.
Figure 7B:
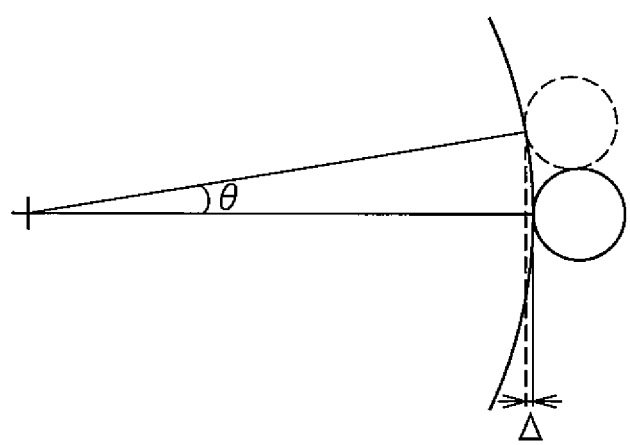

FIG. 7A and FIG. 7B are diagrams explaining a difference of influences of displacement of the probe due to a temperature change between the first embodiment and the conventional example illustrated in FIG. 1.

When a temperature change occurs, each part expands or contracts. Since the base and column have large heat capacities, temperature changes thereof are comparatively small during a short time to be required to carry out one measurement. Therefore, the expansion and contraction quantities due to such temperature changes are also small. On the other hand, since the arm and the detector holder have small heat capacities, the arm and the detector holder expand or contract even if the temperature change occurs in a short time. For example, a quantity of expansion and contraction of an iron arm of 100 mm are 1 micrometer due to the temperature change of 0.1 Celsius degree.

In the conventional example illustrated in FIG. 1, as illustrated in FIG. 7A, when the arm 6 and the detector holder 9 expand or contract due to a temperature change, the displacement d at the tip of the probe is generated on the measurement plane, and the probe displaces from a correct position 33 to a position designated by Reference 33a. Therefore, this displacement d becomes a deviation of surface position of the work, i.e., an error of the measurement. In the roundness measuring apparatus, a measurement error of 1 micrometer is too large to be disregarded.

On the other hand, in the first embodiment, since a long arm is not used, displacement of the probe is small primarily. Further, in the first embodiment, as illustrated in of FIG. 7A, when the detector holder 9 expands or contracts due to a temperature change, the displacement d of the tip of the probe is generated on a plane perpendicular to the measurement plane, and the probe displaces from the correct position 33 to a position designated by Reference 33b. Although the probe deviates from the measurement plane by the displacement, the probe contacts the cylinder surface of the work as illustrated in FIG. 7B since the probe is forced to contact to the work. The deviation Δ in the measuring direction is very small when the deviation is small and θ is small. Concretely, when a radius of the work is R, $\theta = \sin(d/R)$, $\Delta = R(1-\cos\theta)$. As described above, in the first embodiment, even if a temperature change occurs, the influence of the temperature change to the measurement error is small.

Figure 8:
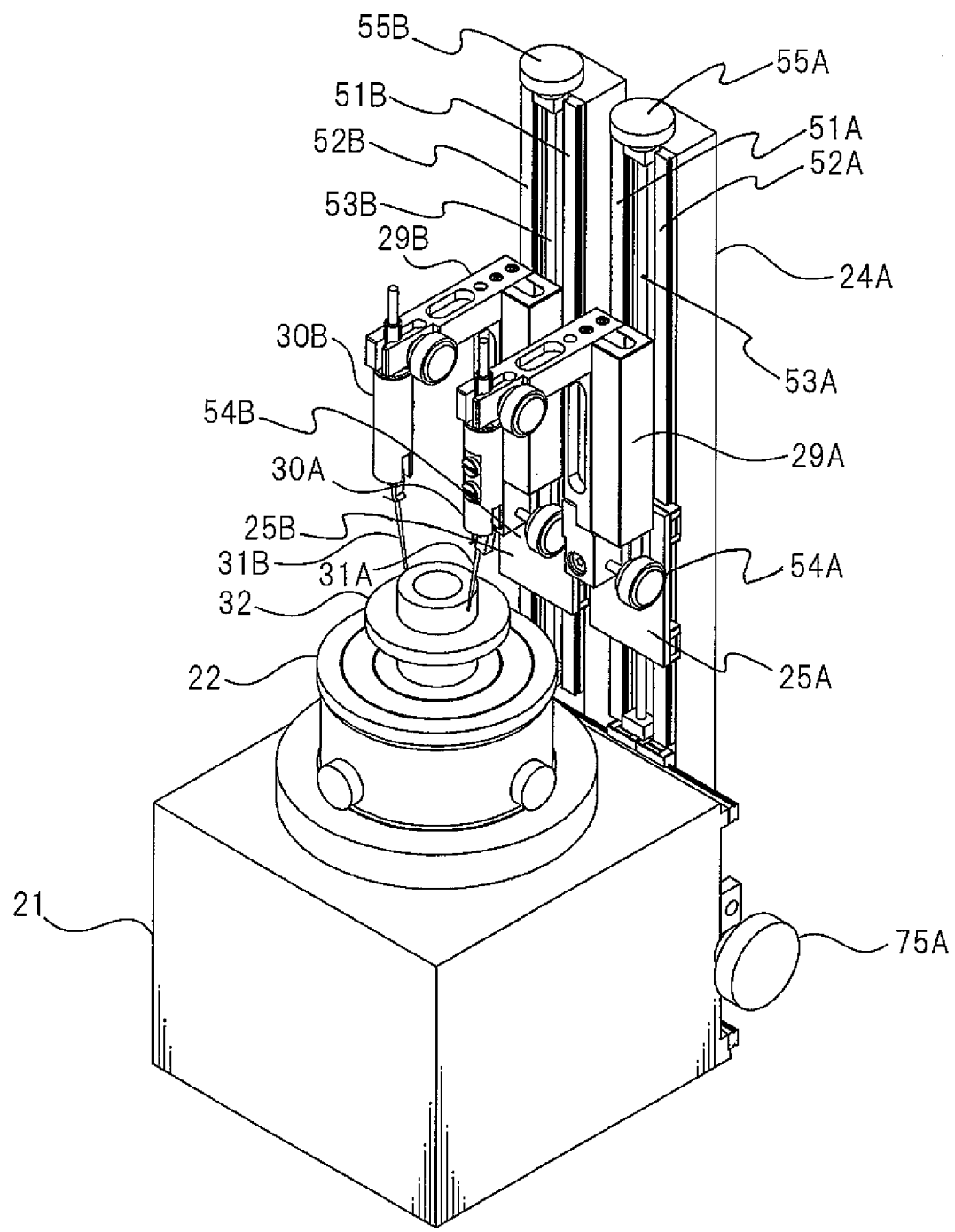
FIG. 8 is an outline view seen from a front side of a roundness measuring apparatus of a second embodiment of the present invention.
Figure 9:
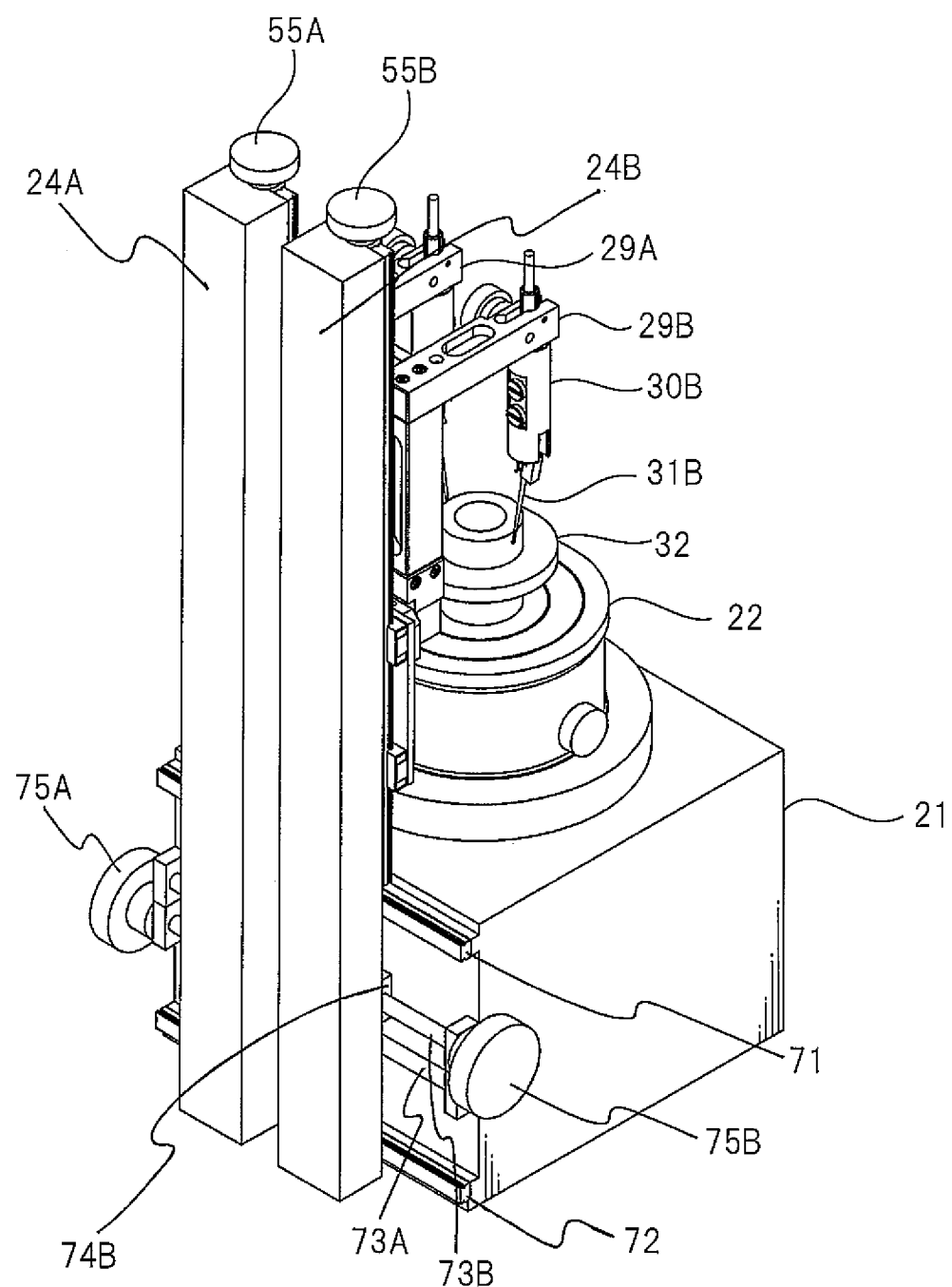
FIG. 9 is an outline view seen from a back side of a roundness measuring apparatus of a second embodiment of the present invention.

FIG. 8 and FIG. 9 are outline views seen from a front side and a back side of a roundness measuring apparatus of a second embodiment of the present invention.

The roundness measuring apparatus of the second embodiment is different from the roundness measuring apparatus of the first embodiment in that two groups of columns, carriages, detector holders and detectors are provided.

As illustrated in the figures, the roundness measuring apparatus of the second embodiment includes: a table-like base 21; a rotatable stage 22; a rotation drive part (not shown); two columns 24A and 24B; two carriages 25A and 25B; two detector holders 29A and 29B; and two detectors 30A and 30B.

On the column 24A, vertical direction guides 51A and 52A and a vertical direction feed screw 53A are provided. The carriage 25A is engaged with the vertical direction feed screw 53A by a vertical direction feed nut. By rotating a vertical direction feed knob 55A, the vertical direction feed screw 53A rotates and the carriage 25A moves in the vertical direction. Similarly, on the column 24B, vertical direction guides 51B and 52B and a vertical direction feed screw 53B are provided. The carriage 25B is engaged with the vertical direction feed screw 53B by a vertical direction feed nut. By rotating a vertical direction feed knob 55B, the vertical direction feed screw 53B rotates and the carriage 25B moves in the vertical direction.

Further, radial direction guides 71 and 72 and two radial direction feed screws 73A and 73B are provided at the back of the base 21. The column 24A is engaged with the radial direction feed screw 73A by a radial direction feed nut 74A. By rotating a radial direction feed knob 75A, the radial direction feed screw 73A rotates and the column 24A moves in parallel to the radial direction. Similarly, the column 24B is engaged with the radial direction feed screw 73B by a radial direction feed nut 74B. By rotating a radial direction feed knob 75B, the radial direction feed screw 73B rotates and the column 24B moves in parallel to the radial direction. Since the columns 24A and 24B are guided with the radial direction guides 71 and 72 of high precision, attitudes of the columns 24A and 24B do not change even if they move. The detector holders 29A and 29B and the detectors 30A and 30B are same as those of the first embodiment. The attaching direction of the detector holder 29B of the detector 30B differs from the attaching direction of the detector holder 29A of the detector 30A by 180 degrees.

FIG. 8 illustrates a state in which the probes 31A and 31B of the detectors 30A and 30B are contacted to two points on the outer cylinder surface, which are symmetric with respect to a rotation axis of the stage 22, i.e., two points corresponding to a diameter of the outer cylinder surface. A change of the diameter of the outer cylinder surface can be measured by calculating a change of a sum of the detecting signals of the detectors 30A and 30B in this state.

Figure 10:
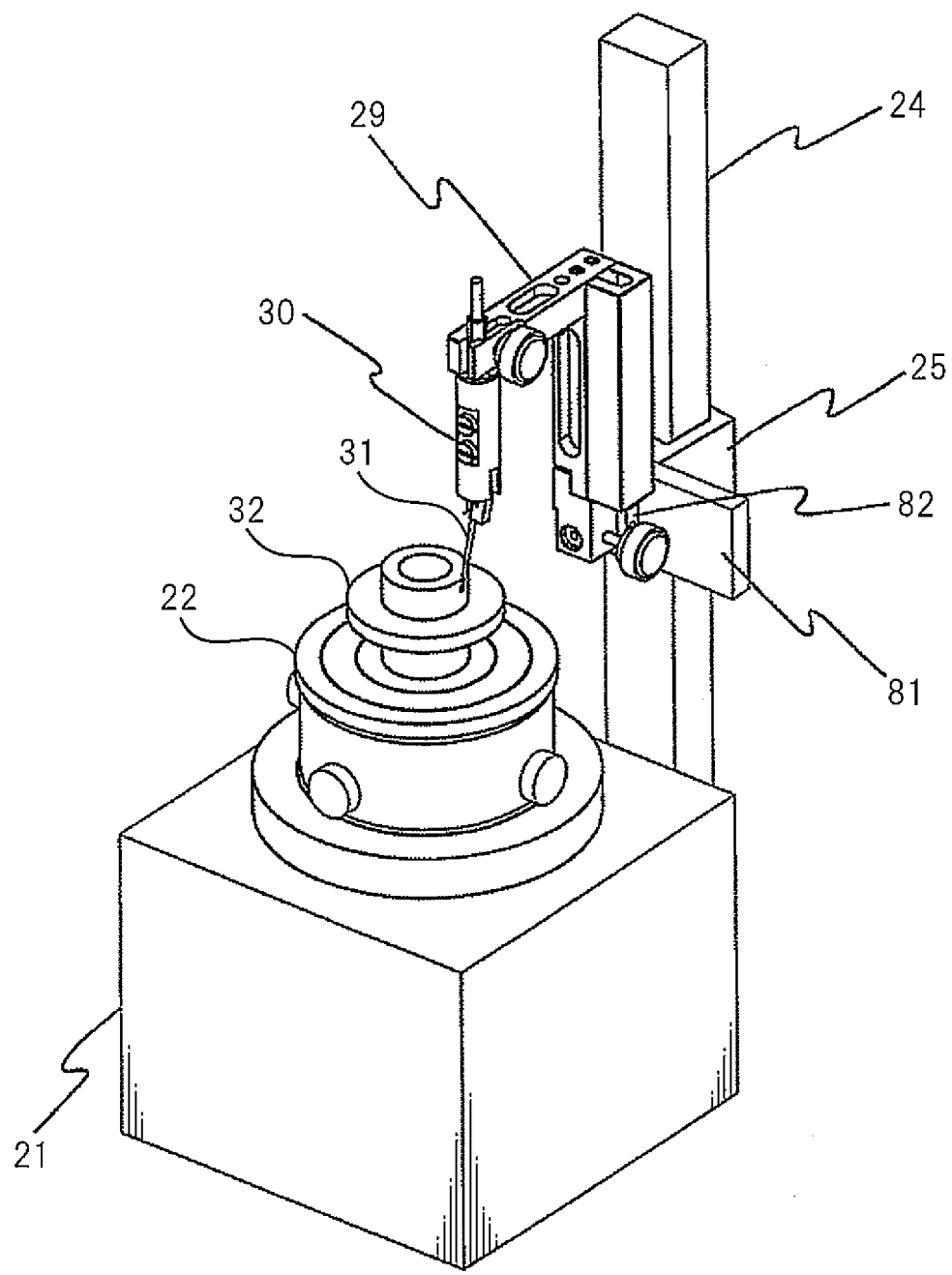
FIG. 10 is an outline view of a roundness measuring apparatus of a third embodiment of the present invention.

FIG. 10 is an outline view of a roundness measuring apparatus of a third embodiment of the present invention.

The roundness measuring apparatus of the third embodiment differs from the roundness measuring apparatus of the first embodiment in that the column 24 is fixed and the detector holder moving mechanism 81, which moves the detector holder 29 in parallel to the measurement plane, is provided at the carriage 25.

In FIG. 10, although the illustration of the moving mechanism of the carriage 25 provided on the column 24 is omitted, the moving mechanism similar to that used in the first embodiment is used.

The detector holder moving mechanism 81 is fixed to the carriage 25, and the detector holder moving mechanism 81 is realized by a moving mechanism, which includes a pair of guides, a feed screw and a feed nut, similar to that of the first embodiment. However, the illustration of the detector holder moving mechanism 81 is omitted in FIG. 10. The detector holder moving mechanism 81 moves a holder holding part, to which a detector holder 29 is attached, in parallel to the measurement plane and in a direction perpendicular to a rotation axis of the stage 22.

In the roundness measuring apparatus of the third embodiment, as similar to the roundness measuring apparatus of the first embodiment, when the diameters of the cylinder surfaces to be measured are different, the detector holder 29 and the detector 30 are moved in the radial direction along the measurement plane, and the probe 31 contacts a cylinder surface on a line, at which the measurement plane and the cylinder surface cross, and is displaced on the measurement plane. As similar to the roundness measuring apparatus of the first embodiment, a setting space becomes small in the roundness measuring apparatus of the third embodiment.

The first to third embodiments have been described above. In any of the first to third embodiments, a column is provided at the back of a rotation table, and a detector holder 29 and a detector 30 are moved in a radial direction along the measurement plane. In other words, the two-dimensional moving mechanism, which moves the holder holding parts (carriage etc.) to which the detector holder 29 is attached in two dimensions in parallel to the measurement plane, is provided at the back of the base. Thereby, a setting space can be made small under the condition that the indispensable matters of measuring roundness are satisfied.

It is to be understood that there can be various modifications regarding the above embodiments.

The present invention is applicable to roundness measuring apparatuses and measuring devices which have similar functions as the roundness measuring apparatuses.

What is claimed is:

1. A roundness measuring apparatus comprising:
   a base;
   a turn-table which is fixed to the base and rotates a work placed on the turn-table;
   a two-dimensional moving mechanism provided at the base to move a first holder holding part in parallel to a measurement plane including a rotation axis of the turn-table and a measuring point of the work, wherein the two-dimensional moving mechanism includes a first column which extends in parallel to the rotation axis of the turn-table and moves in parallel to the measurement plane, and a first holding part moving mechanism which supports the first holder holding part to be movable along the first column;
   a first detector holder attached to the first holder holding part;
   a first detector attached to the first detector holder so that a probe can be displaced on the measurement plane;
   a second column which extends in parallel to the first column and is independently movable with respect to the first column in parallel to the measurement plane;
   a second holding part moving mechanism which supports a second holder holding part to be movable along the second column;
   a second detector holder attached to the second holder holding part;
   a second detector attached to the second detector holder so that a probe can be displaced on the measurement plane; and
   a column moving mechanism which moves the first column and the second column in parallel to the measurement plane, wherein the column moving mechanism includes a guide mechanism which holds the first column and the second column in parallel to the rotation axis of the turn-table, and a first feed mechanism which moves the first column; and a second feed mechanism which moves the second column and is independent from the first feed mechanism.

\* \* \* \* \*